April 30, 1929.    R. B. SHANCK    1,711,101
MEANS FOR INDICATING FREQUENCY CHANGES
Filed Aug. 21, 1923

INVENTOR
R. B. Shanck
BY
ATTORNEY

Patented Apr. 30, 1929.  1,711,101

UNITED STATES PATENT OFFICE.

ROY B. SHANCK, OF WOODSIDE, NEW YORK, ASSIGNOR TO AMERICAN TELEPHONE AND TELEGRAPH COMPANY, A CORPORATION OF NEW YORK.

MEANS FOR INDICATING FREQUENCY CHANGES.

Application filed August 21, 1923. Serial No. 658,606.

This invention relates to arrangements for indicating changes in the frequency generated by any suitable source of alternating current.

It is frequently desirable in connection with an alternating current generator or other source of alternating current to keep the frequency constant, and in this connection it is desirable that any change in frequency be indicated. It is one of the objects of this invention to devise a method of and a means for indicating any change in the frequency generated by an alternating current source. This object, as well as other objects of the invention, is accomplished by transmitting a part of the energy generated through two networks, each of which has a characteristic such that a large change in attenuation occurs for a small change in frequency, one of the networks increasing its attenuation and the other of the networks decreasing its attenuation for a change in frequency in the same direction. By balancing the components transmitted by the two networks against each other and rectifying the balanced components, a very sensitive indicating device may be operated.

Figure 1:
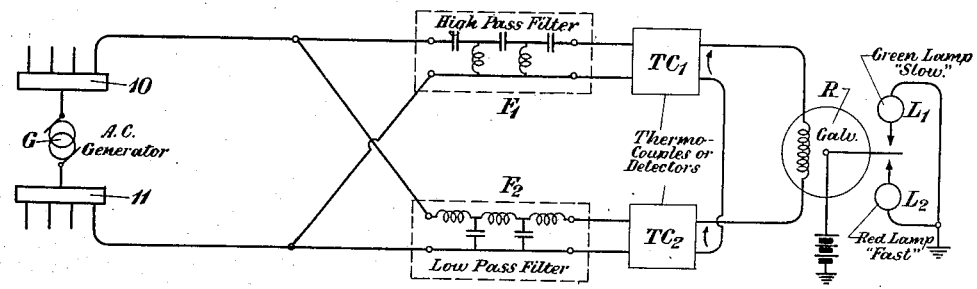
Figure 2:
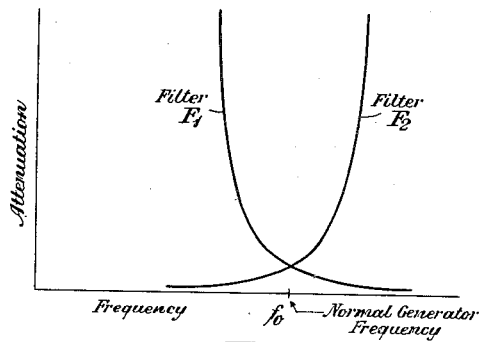

The invention will now be more fully understood from the following description when read in connection with the accompanying drawing, Figure 1 of which shows a circuit arrangement embodying a preferred form of the invention; Fig. 2 of which shows curves illustrating the operation of the circuit of Fig. 1; and Fig. 3 of which illustrates a form of thermocouple which may be used in the circuit of Fig. 1.

Referring to Fig. 1, G designates a suitable source of alternating current such as an A. C. generator, and 10 and 11 designate busbars connected to the poles of the generator. A high pass filter $F_1$ is connected to the busbars as indicated and in parallel therewith a low pass filter $F_2$ is similarly connected to the bus-bars. The filters $F_1$ and $F_2$ are of a type well-known in the art and have characteristics such that they will transmit without attenuation a band of frequencies of definite width while sharply attenuating frequencies lying without the band. In general, a high pass filter attenuates all frequencies lying below a critical frequency, while the low pass filter attenuates all frequencies lying above the critical frequency. In circuit with each filter is arranged a thermocouple or detector for rectifying the A. C. energy transmitted through the filter. The thermocouples or detectors are indicated at $TC_1$ and $TC_2$, respectively, and their output sides are connected to the winding of a galvanometer R in such a manner that the rectified energy from the one thermocouple or detector opposes the rectified energy from the other thermocouple or detector. The galvanometer is so arranged that when its needle is shifted from its normal position, it will close the circuit for one or the other of two lamps $L_1$ and $L_2$.

Figure 3:
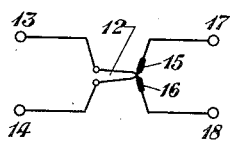

In case detectors are employed as the elements $TC_1$ and $TC_2$ any well-known type of detector such as is commonly used in radio transmission may be used. In case thermocouples are employed, they may be of any type well-known in the art, an example of which is illustrated in Fig. 3, the thermocouple comprising a filamentary element 12 which is heated by the alternating current passing from terminal 13 to terminal 14 through the filter, the filament being arranged to heat a junction of two dissimilar metals 15 and 16, so that a direct current E. M. F. is produced between terminals 17 and 18, the E. M. F. being proportional to the magnitude of the alternating current flowing through the filament.

The characteristics of the filters $F_1$ and $F_2$ are indicated in Fig. 2, in which attenuation is plotted against frequency. It will be seen from Fig. 2 that the attenuation of the filter $F_1$, is practically negligible for frequencies above the frequency $f_0$, but as the frequency falls below this critical frequency, the attenuation increases very rapidly, so that the filter is said to have a very sharp cut-off at this point. Similarly, the low pass filter $F^2$ has substantially no attenuation at frequencies from zero up to the critical frequency $f_0$ but the attenuation increases very rapidly for frequencies higher than $f_0$. The point of intersection of the two attenuation curves need not of course be exactly at the critical or cut-off frequencies of the filters. In fact it is in some cases preferable to have the intersection slightly above the cut-off frequency of the low-pass filter and slightly below that of the high-pass filter.

It will be at once evident from the curves of Fig. 2 that if the generator G is generating a frequency of $f_0$, the alternating current impressed upon the thermocouples $TC_1$ and $TC_2$ will be equal, and if the two thermocouples are identical in structure, equal direct current E. M. F.'s will be produced in the output circuits. As the circuit is so arranged that the two E. M. F.'s will oppose each other, the needle of the galvanometer R will stand in its intermediate position. If the frequency of the generator G increases, the attenuation of the filter $F_2$ will be increased, while that of the filter $F_1$ will be decreased. Consequently, the E. M. F. on the output side of the thermocouple $TC_1$ will increase and the E. M. F. on the output side of the thermocouple $TC_2$ will decrease, so that a resultant current will flow through the galvanometer in such a direction as to shift its needle to close the circuit of the lamp $L_1$. On the other hand, if the frequency $f_0$ decreases, the attenuation of the filter $F_1$ will be increased, while that of the filter $F_2$ will be decreased, so that a resultant direct current E. M. F. will be produced in the output circuit in the opposite direction. Consequently, the needle of the galvanometer will be shifted in the opposite direction to close the circuit of the lamp $L_2$.

The use of two filters in parallel in a differential circuit such as above described has a number of important advantages. In the first place, any change of frequency producing a change in attenuation in one direction for one of the filters produces an opposite change in attenuation for the other filter, so that the effect is doubled and a more positive indication will be obtained. Also, if the characteristics of the filters change from time to time due to some external cause, such as temperature changes, the two filters will be affected in the same manner and the normal frequency of the indicating device will not be changed.

It will be obvious that the general principles herein disclosed may be embodied in many other organizations widely different from those illustrated without departing from the spirit of the invention as defined in the following claims.

What is claimed is:

1. A frequency indicating arrangement comprising a source of alternating current, a high pass filter and a low pass filter associated therewith, means associated with each filter for translating an alternating current wave transmitted therethrough into a direct current electromotive force proportional to the magnitude of the alternating current wave, and an indicating instrument differentially connected with said last mentioned means.

2. A frequency indicating arrangement comprising a source of alternating current, a pair of band filters associated therewith, one having a substantially sharp lower cut-off and the other a substantially sharp upper cut-off, means associated with each filter for translating an alternating current wave into a direct current electromotive force proportional to the magnitude of the alternating current wave, and an indicating instrument differentially connected to said last mentioned means.

In testimony whereof, I have signed my name to this specification this 17th day of August, 1923.

ROY B. SHANCK.